(12) United States Patent
Huang et al.

(10) Patent No.: US 7,245,088 B2
(45) Date of Patent: Jul. 17, 2007

(54) POWER CONTROL CIRCUIT FOR CONTROLLING RATED POWER SUPPLIED TO A LOAD

(75) Inventors: Chien-Ming Huang, Kaohsiung (TW); Tsorng-Juu Liang, Kaohsiung (TW)

(73) Assignee: Lightek Electronics Co., Ltd. (TW)

( * ) Notice: Subject to any disclaimer, the term of this patent is extended or adjusted under 35 U.S.C. 154(b) by 0 days.

(21) Appl. No.: 11/429,940

(22) Filed: May 9, 2006

(65) Prior Publication Data

US 2006/0261746 A1    Nov. 23, 2006

(30) Foreign Application Priority Data

May 19, 2005    (TW)    ................................ 94116314 A

(51) Int. Cl.
*G05F 1/00*    (2006.01)
(52) U.S. Cl. ...................... 315/291; 315/224; 315/247; 315/225; 315/244; 315/DIG. 5
(58) Field of Classification Search ................ 315/119, 315/127, 219, 224, 225, 307, 247, 244, 82, 315/83, 200 R, 209 R, 289, 290, DIG. 5, 315/DIG. 7
See application file for complete search history.

(56) References Cited

U.S. PATENT DOCUMENTS

| | | | | |
|---|---|---|---|---|
| 5,140,229 A | * | 8/1992 | Yagi et al. | 315/307 |
| 5,384,518 A | * | 1/1995 | Kido et al. | 315/225 |
| 5,449,973 A | * | 9/1995 | Yamashita et al. | 315/82 |
| 6,958,581 B2 | * | 10/2005 | Okawa et al. | 315/291 |

* cited by examiner

*Primary Examiner*—Haissa Philogene
(74) *Attorney, Agent, or Firm*—Nixon Peabody LLP; Jeffrey A. Lindeman

(57) ABSTRACT

A power control circuit includes a power switch unit operable so as to enable and disable supply of an input voltage from an external power source to an LC circuit, a voltage detecting unit for generating a first voltage signal in accordance with an output voltage applied to a load and outputted by the LC circuit, and a current detecting unit for generating a second voltage signal in accordance with a current flowing through the power switch unit. A driver receives a pulse width modulation signal from a comparator in accordance with a comparison result between a summation of the first and second voltage signals and a reference voltage, and outputs a driving signal to a control input unit of the power switch unit so as to control a duty cycle of the power switch unit, thereby controlling rated power supplied to the load to correspond to the reference voltage.

9 Claims, 10 Drawing Sheets

| MANUFACTURER | Type No. of Lamp | Lamp Voltage (V) | Lamp Current (A) | Lamp Power (W) |
|---|---|---|---|---|
| PHILIPS | CDM-TD 70W/830 | 85.1 | 0.823 | 70 |
| PHILIPS | CDM-R 70W/942 PAR30L | 84.8 | 0.823 | 69.6 |
| PHILIPS | CDM-R 70W/830 PAR30L | 87.8 | 0.798 | 70.1 |
| PHILIPS | CDM-R 70W/830 PAR30L/M/SP | 96.9 | 0.725 | 70 |
| PHILIPS | CDM-T 70W/942 | 85.7 | 0.822 | 70.4 |
| PHILIPS | CDM-T 70W/830 | 82.8 | 0.844 | 69.9 |
| PHILIPS | MHC70/C/U/MP/3K | 103.3 | 0.673 | 69.5 |
| PHILIPS | SON70W(HPS) | 76.5 | 0.921 | 70.5 |
| GE | CMH70/TD/UVC/942 | 80 | 0.874 | 69.9 |
| GE | CMH70/TD/UVC/830 | 79.6 | 0.874 | 69.6 |
| GE | CMH70/U/PAR30L | 91.7 | 0.76 | 69.8 |
| GE | CHM70/T/UVC/942 | 83.9 | 0.833 | 69.7 |
| GE | CHM70/T/UVC/830 | 94.5 | 0.744 | 70.3 |
| IWASAKI | MT70SDW/MWD | 75.4 | 0.924 | 69.6 |
| IWASAKI | MT70CE-DW/S | 77.1 | 0.91 | 70.1 |
| IWASAKI | MT70CE-WW/S | 81.3 | 0.862 | 70.2 |
| IWASAKI | MT70CE-W/S | 89.3 | 0.782 | 69.7 |
| IWASAKI | MT70D | 75.1 | 0.933 | 70.1 |
| OSRAM | HQI-E 70W/NDL | 76.6 | 0.913 | 69.9 |

AVERAGE OUTPUT POWER = 69.6
MAXIMUM OUTPUT POWER = 70.5
MINIMUM OUTPUT POWER = 69.5
OUTPUT POWER ERROR(%) = ±0.71%

POWER CONTROL CIRCUIT FOR CONTROLLING RATED POWER SUPPLIED TO A LOAD

CROSS-REFERENCE TO RELATED APPLICATION

This application claims priority of Taiwanese Application No. 094116314, filed on May 19, 2005.

BACKGROUND OF THE INVENTION

1. Field of the Invention

The invention relates to a power control circuit, more particularly to a power control circuit for controlling rated power supplied to a load.

2. Description of the Related Art

High intensity discharge (HID) lamps have been widely used to replace incandescent lamps as a result of high light-emitting efficiency and long service life thereof. In actual use, since a high intensity discharge lamp has an equivalent impedance that increases with an activation period, in order to maintain a stable lumen output of the HID lamp, an electronic ballast is used to control rated power supplied to the HID lamp, thereby avoiding damage to the high intensity discharge lamp.

FIG. 1 illustrates a conventional electronic ballast for an HID lamp (L) that includes a filter and rectifying circuit 40, an active power factor correction circuit 10, a power control circuit 20, and a full-bridge rectify circuit 30.

The filter and rectifying circuit 40 filters and rectifies an AC voltage signal (vi), and outputs a DC voltage. The active power factor correction circuit 10 is a boost DC-to-DC converter consisting of a boost inductor ($L_{Boost}$), a boost power switch ($S_{Boost}$), a boost diode ($D_{Boost}$) and a capacitor ($C_{dc1}$).

The active power factor correction circuit 10 boosts the DC voltage from the filter and rectifying circuit 40 to generate a boosted DC voltage, and supplies the boosted DC voltage to the capacitor ($c_{dc1}$). The active power factor correction circuit 10 is operable so as to enable a current flowing through the boost inductor ($L_{Boost}$) to track the DC voltage from the filter and rectifying circuit 40 by controlling the boost power switch ($S_{Boost}$) in a known manner.

The power control circuit 20 includes: a buck DC-to-DC converter, which consists of a buck power switch ($S_{Buck}$), a buck diode ($D_{Buck}$), a buck inductor ($L_{Buck}$) and a capacitor ($c_{dc2}$), for outputting an output voltage that is converted into an AC voltage outputted to the HID lamp (L) by the full-bridge rectifying circuit 30; a voltage detecting unit (Kv) for detecting a voltage applied to the HID lamp (L) and for outputting a voltage signal in accordance with the voltage applied to the HID lamp (L); a current detecting unit (Ki) for detecting a current flowing through the HID lamp (L) and for outputting a current signal in accordance with the current flowing through the HID lamp (L); a multiplier for outputting a power signal in accordance with a product of the voltage signal and the current signal from the voltage and current detecting units (Kv, Ki); an error amplifier (EA) for amplifying a comparison result between the power signal and a first reference signal; a comparator (comp) for outputting a pulse width modulation signal in accordance with a comparison result between the amplified comparison result from the error amplifier (EA) and a second reference signal; and a driver receiving the pulse width modulation signal from the comparator (comp) and outputting a driving signal to a control input end of the buck power switch ($S_{Buck}$) so as to control a duty cycle of the buck power switch ($S_{Buck}$), thereby controlling rated power supplied to the HID lamp (L) through the full-bridge rectifying circuit 30.

In such a configuration, the power control circuit 20 consists of a large number of components, thereby resulting in relatively high costs. Particularly, the multiplier is an expensive component, and use of the same results in a relatively complicated layout and a larger size.

SUMMARY OF THE INVENTION

Therefore, the object of the present invention is to provide a relatively inexpensive power control circuit that can control rated power supplied to a load.

According to one aspect of the present invention, a power control circuit comprises:

an LC circuit adapted to be connected to a load and adapted to output an output voltage to the load;

a power switch unit connected to the LC circuit, adapted to be connected to an external power source for receiving an input voltage therefrom, and operable so as to enable and disable supply of the input voltage from the external power source to the LC circuit, the power switch unit having a control input unit;

a voltage detecting unit for detecting the output voltage applied to the load and for generating a first voltage signal in accordance with the output voltage applied to the load;

a current detecting unit for detecting a current flowing through the power switch unit and for generating a second voltage signal in accordance with the current flowing through the power switch unit;

a comparator for comparing a summation of the first and second voltage signals with a reference voltage and for outputting a pulse width modulation signal in accordance with a comparison result between the summation of the first and second voltage signals and the reference voltage; and a driver connected electrically to the control input unit of the power switch unit and the comparator, the driver receiving the pulse width modulation signal from the comparator and outputting a driving signal to the control input unit of the power switch unit so as to control a duty cycle of the power switch unit, thereby controlling rated power supplied to the load to correspond to the reference voltage.

According to another aspect of the present invention, there is provided a method of controlling rated power supplied by a power control circuit to a load. The power control circuit includes an LC circuit connected to a load and outputting an output voltage to the load, and a power switch unit connected to the LC circuit, connected to an external power source for receiving an input voltage therefrom, and operable so as to enable and disable supply of the input voltage from the external power source to the LC circuit, the power switch unit having a control input unit.

The method comprises the steps of:

detecting the output voltage applied to the load and generating a first voltage signal in accordance with the output voltage applied to the load;

detecting a current flowing through the power switch unit and generating a second voltage signal in accordance with the current flowing through the power switch unit;

comparing a summation of the first and second voltage signals with a reference voltage and outputting a pulse width modulation signal in accordance with a comparison result between the summation of the first and second voltage signals and the reference voltage; and outputting a driving signal to the control input unit of the power switch unit in accordance with the pulse width modulation signal so as to control a duty cycle of the power switch unit, thereby controlling the rated power to correspond to the reference voltage.

BRIEF DESCRIPTION OF THE DRAWINGS

Other features and advantages of the present invention will be come apparent in the following detailed description of the preferred embodiments with reference to the accompanying drawings, of which:

FIG. 14 illustrates voltage, current and power measurement results associated with various types of lamps supplied with rated power under the control of the power control circuit of this invention.

DETAILED DESCRIPTION OF THE PREFERRED EMBODIMENTS

Figure 1:
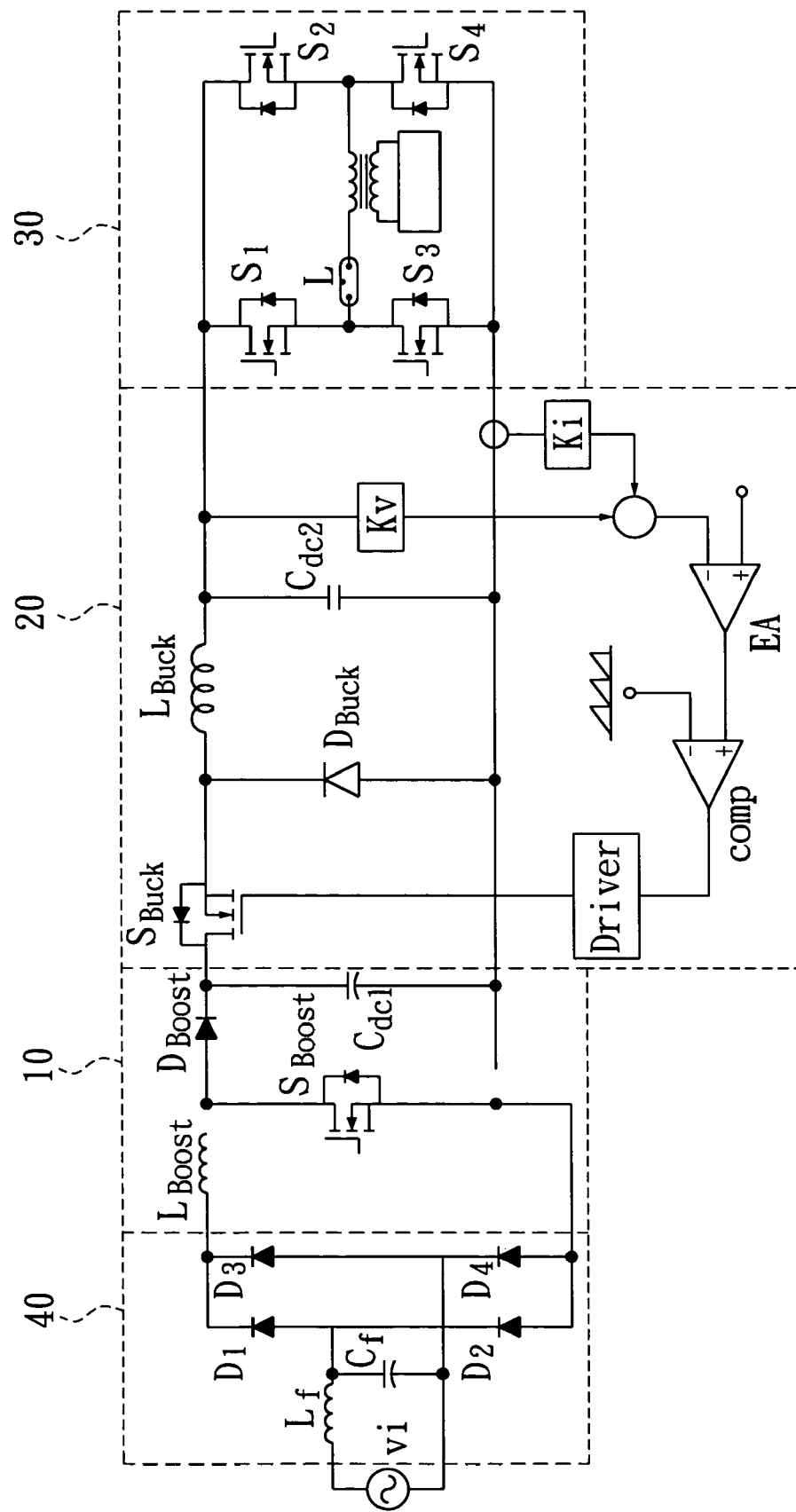
FIG. 1 is a schematic electrical circuit diagram illustrating a conventional electronic ballast for a high intensity discharge lamp.

Before the present invention is described in greater detail, it should be noted that like elements are denoted by the same reference numerals throughout the disclosure.

Figure 2:
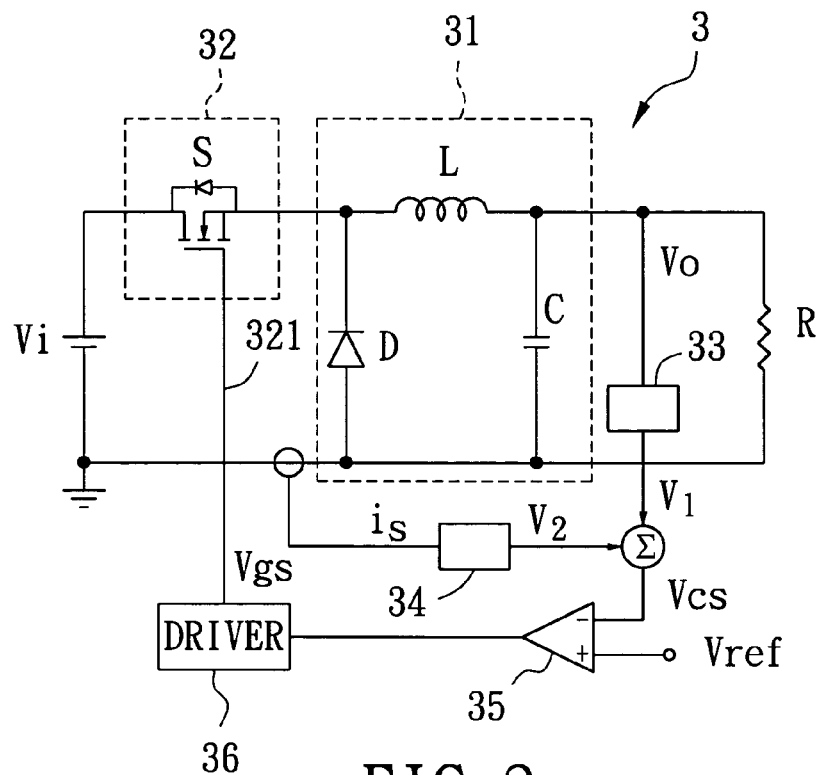
FIG. 2 is a schematic equivalent circuit diagram of the first preferred embodiment of a power control circuit according to the present invention, illustrating how rated power supplied thereby to a load is controlled.
Figure 3:
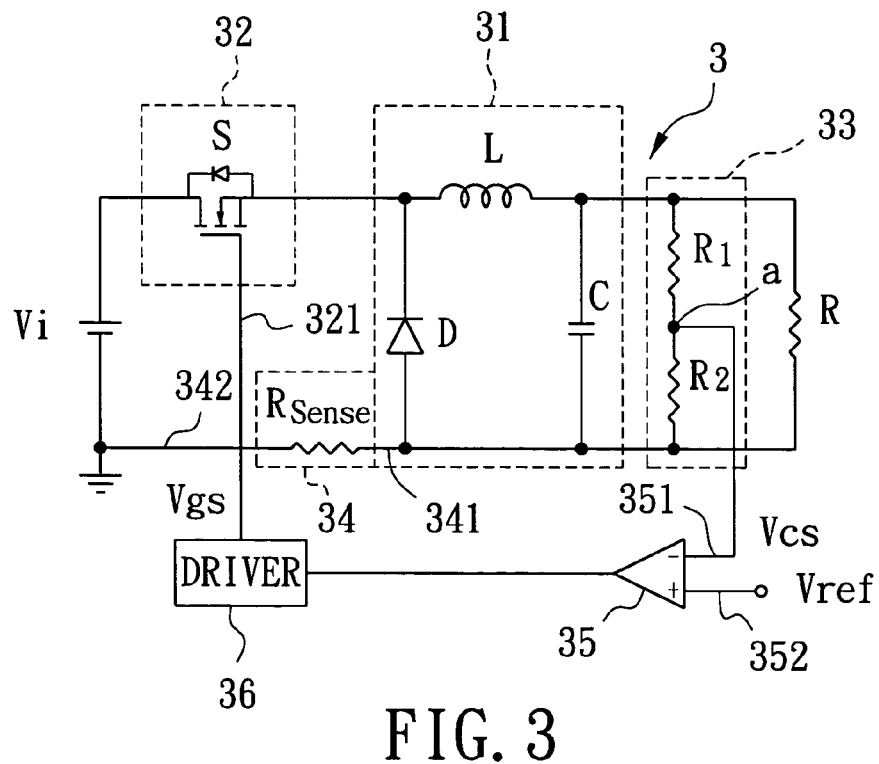
FIG. 3 is a schematic electrical circuit diagram illustrating the first preferred embodiment.

Referring to FIGS. 2 and 3, the first preferred embodiment of a power control circuit 3 according to the present invention is shown to include a buck DC-to-DC converter consisting of an LC circuit 31 and a power switch unit 32, a voltage detecting unit 33, a current detecting unit 34, a comparator 35, and a driver 36. In this embodiment, the power control circuit 3 can be implemented in the aforesaid conventional electronic ballast of FIG. 1.

The LC circuit 31 is adapted to be connected to a load (R), and is adapted to output an output voltage (Vo) to the load (R). In this embodiment, the LC circuit 31 consists of an inductor (L), a diode (D) and a capacitor (C). An impedance of the load (R) can be equal to an equivalent impedance of the full-bridge rectifying circuit 30 and the HID lamp of FIG. 1.

The power switch unit 32 is connected to the LC circuit 31, is adapted to be connected to an external power source (not shown) for receiving an input voltage (Vi) therefrom, and is operable so as to enable and disable supply of the input voltage (Vi) from the external power source to the LC circuit 31. The power switch unit 32 has a control input unit. In this embodiment, the power switch unit 32 includes a switch (S), such as a BJT, a MOSFET or an IGBT, that has a control terminal 321 serving as the control input unit. The input voltage (Vi) from the external power source can be equivalent to an output voltage outputted by the power factor correction circuit 10 of FIG. 1.

The voltage detecting unit 33 detects the output voltage (Vo) applied to the load (L), and generates a first voltage signal (V1) in accordance with the output voltage (Vo) applied to the load (L). In this embodiment, the voltage detecting unit 33 includes a series of first and second resistors (R1, R2) adapted to be connected across the load (L), as shown in FIG. 3. The first voltage signal (V1) is a voltage drop at the second resistor (R2).

The current detecting unit 34 detects a current ($i_s$) flowing through the power switch unit 32, and generates a second voltage signal (V2) in accordance with the current ($i_s$) flowing through the power switch unit 32. In this embodiment, the current detecting unit 34 includes a level resistor ($R_{sense}$) connected in series to a current path of the power switch unit 32 and the LC circuit 31 and connected electrically to the voltage detecting unit 33, as shown in FIG. 3. More specifically, the level resistor ($R_{sense}$) has a first end 341 connected electrically to the second resistor (R2) of the voltage detecting unit 33 and the LC circuit 31, and a grounded second end 342. The second voltage signal (V2) is a voltage drop at the level resistor ($R_{sense}$).

The comparator 35 compares a summation (Vcs) of the first and second voltages (V1, V2) with a reference voltage (Vref), and outputs a pulse width modulation signal in accordance with a comparison result between the summation (Vcs) of the first and second voltage signals (V1, V2) and the reference voltage (Vref). In this embodiment, the comparator 35 has a first input end 351 connected to a junction node (a) of the first and second resistors (R1, R2) of the voltage detecting unit 33 so as to receive the summation (Vcs) of the first and second voltage signals (V1, V2), and a second input end 352 for receiving the reference voltage (Vref), as shown in FIG. 3.

The driver 36 is connected electrically to the control terminal 321 of the switch (S) of the power switch unit 32 and the comparator 35, receives the pulse width modulation signal from the comparator 35, and outputs a driving signal (Vgs) to the control terminal 321 of the switch (S) of the power switch unit 32 so as to control a duty cycle of the switch (S) of the power switch unit 32, thereby controlling rated power supplied to the load (R) to correspond to the reference voltage (Vref).

In order embodiments of this invention, the voltage detecting unit may be implemented using a photocoupler, a voltage transformer or an operational amplifier, and the current detecting unit may be implemented using a current transformer or an operational amplifier.

Figure 15:
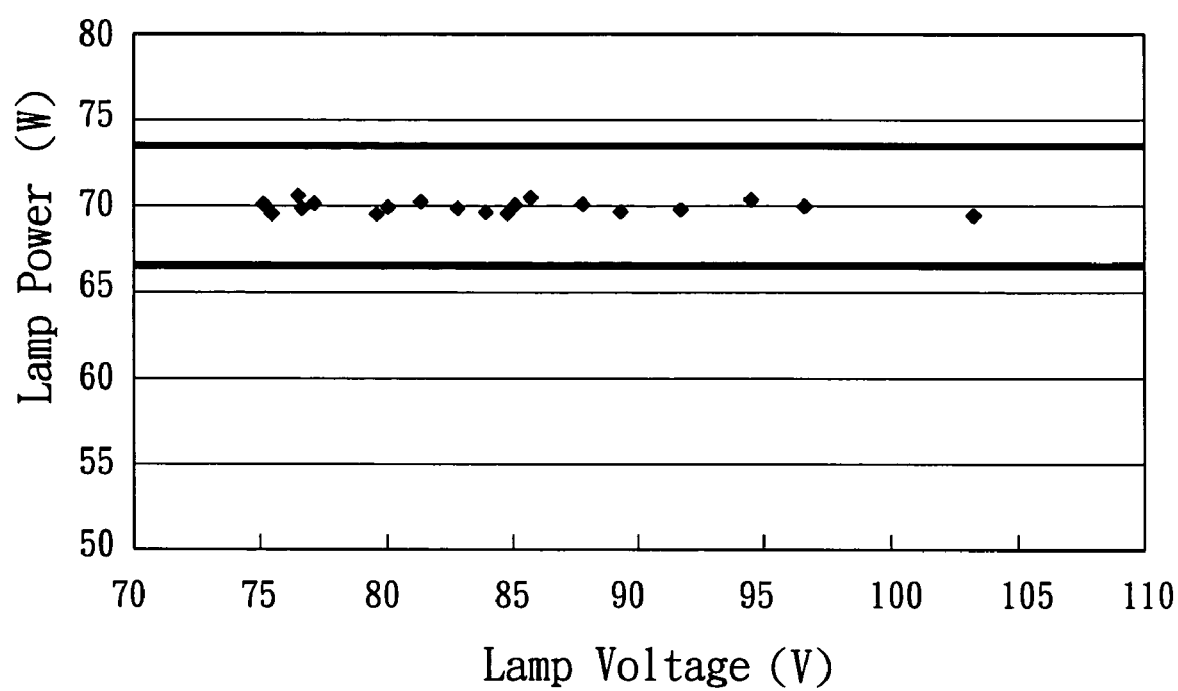
FIG. 15 is a plot illustrating the voltage and power measurement results of FIG. 14.

FIGS. 14 and 15 illustrate actual measurement results measured from various types of HID lamps supplied with rated power (lamp power) under the control of the power control circuit 3, wherein each of the HID lamps has an impedance ranging from 70Ω to 206Ω, the output voltage (lamp voltage) ranges from 70 volts to 120 volts, and variation of the power does not exceed 0.71%. Therefore, control of rated power supplied to the lamps can be achieved.

Figure 4:
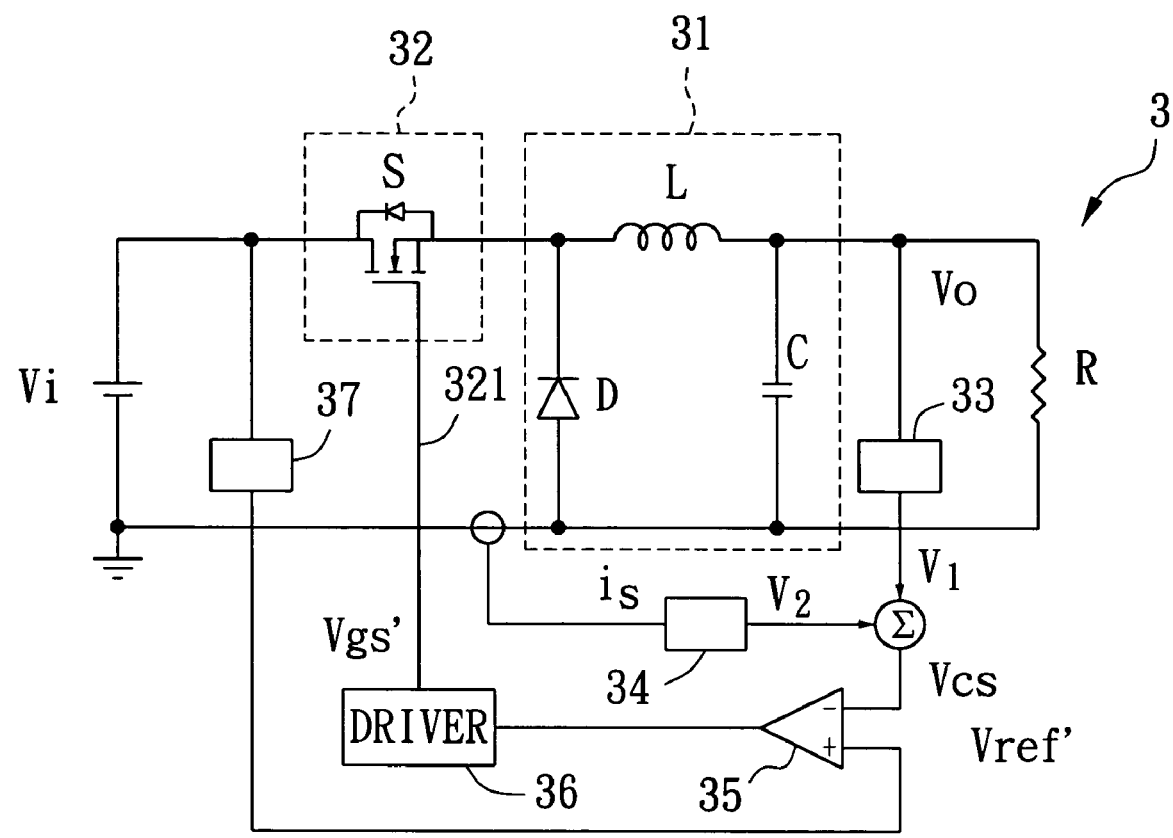
FIG. 4 is a schematic equivalent circuit diagram of the second preferred embodiment of a power control circuit according to the present invention, illustrating how rated power supplied thereby to a load is controlled.
Figures 5A, 5B, 5C, 5D:
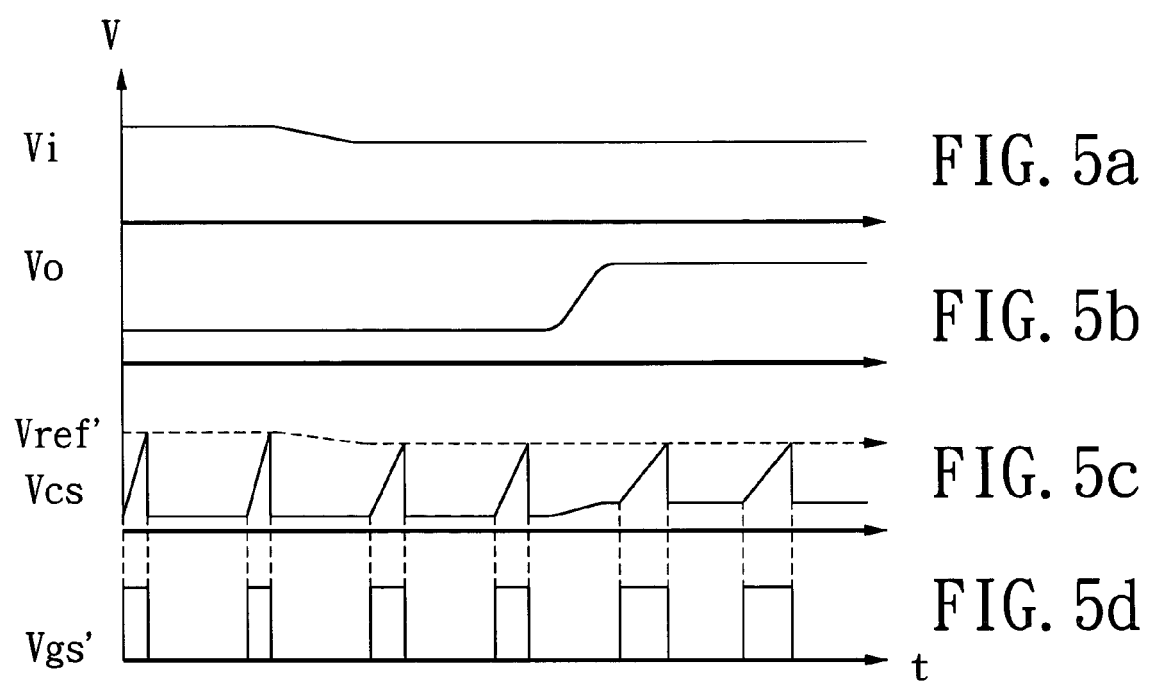
FIGS. 5a to 5d are plots of an input voltage (Vi), an output voltage (Vo), a summation (Vcs) of first and second voltage signals (V1, V2), and a pulse width modulation signal (Vgs')
Figure 6:
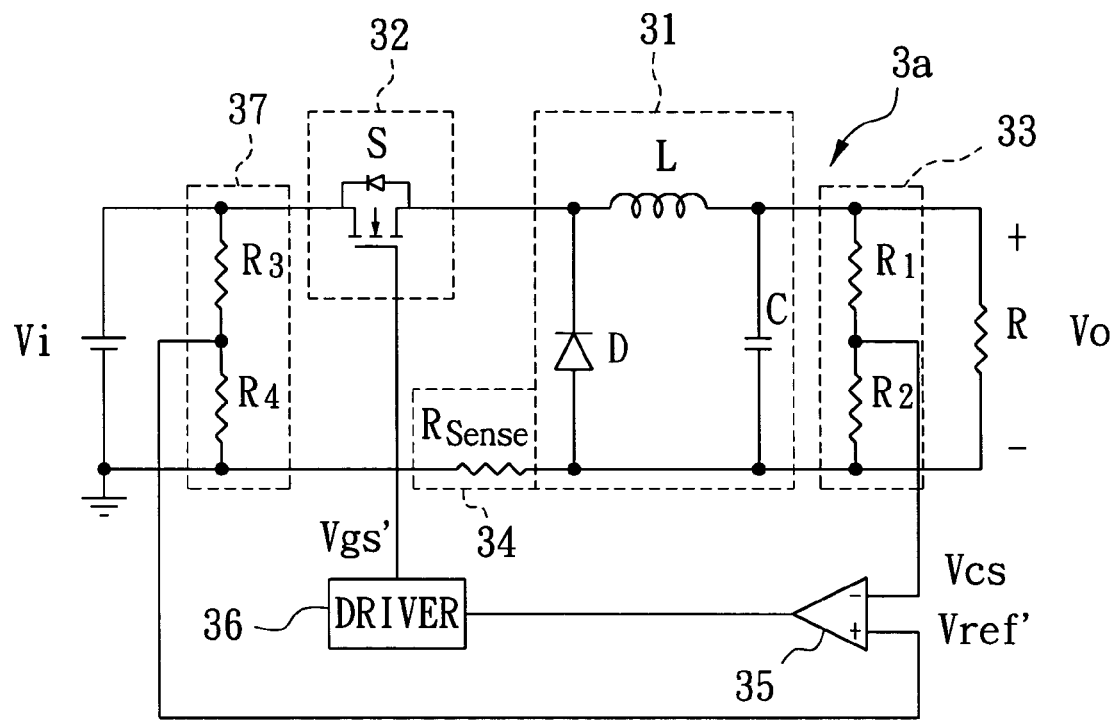
FIG. 6 is a schematic electrical circuit diagram of the second preferred embodiment.

FIGS. 4 and 6 illustrate the second preferred embodiment of a power control circuit (3a) according to this invention, which is a modification of the first preferred embodiment. In this embodiment, the power control circuit (3a) further includes an input voltage detecting unit 37 for detecting the input voltage (Vi), as shown in FIG. 5a, from the external power source and for providing to the comparator 35 the reference voltage (Vref') indicated by a dotted-line curve of FIG. 5c that is generated in accordance with the input voltage (Vi). In this embodiment, as shown in FIG. 6, the input voltage detecting unit 37 includes a series of third and fourth resistors (R3, R4) adapted to be connected across the external power source. The reference voltage (Vref') is a voltage drop at the fourth resistor (R4). As such, the driver 36 outputs the driving signal (Vgs'), as shown in FIG. 5d, to the control terminal 321 of the switch (S) of the power switch unit 32 to control the output voltage (Vo), as shown in FIG. 5b, of the LC circuit 31. It is noted that, since the power control circuit (3a) is capable of controlling the rated power supplied to the load (R) to correspond to the reference voltage (Vref'), the rated power supplied to the load (R) is varied with the reference voltage (Vref'). As such, for the load (R) being a lamp, a dimming function can be achieved by varying the reference voltage (Vref').

In other embodiments of this invention, the input voltage detecting unit may be implemented using a photocoupler, a voltage transformer or an operational amplifier.

Figure 7:
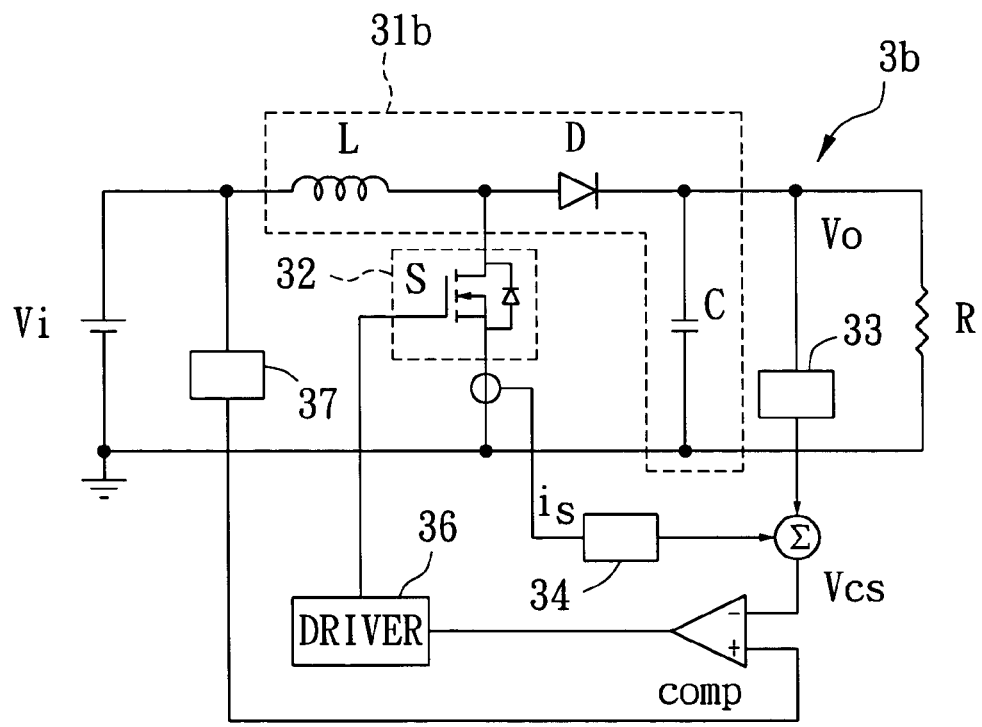
FIG. 7 is a schematic equivalent circuit diagram of the third preferred embodiment of a power control circuit according to the present invention, illustrating how rated power supplied thereby to a load is controlled.

FIG. 7 illustrates the third preferred embodiment of a power control circuit (3b) according to this invention, which is a modification of the second preferred embodiment. The power control circuit (3b) of FIG. 7 differs from the power control circuit (3a) of FIG. 4 in that the DC-to-DC converter is a boost DC-to-DC converter, wherein the LC circuit (31b) is connected electrically to the input voltage detecting unit 37, and the power switch unit 32 is connected electrically to the current detecting unit 34.

Figure 8:
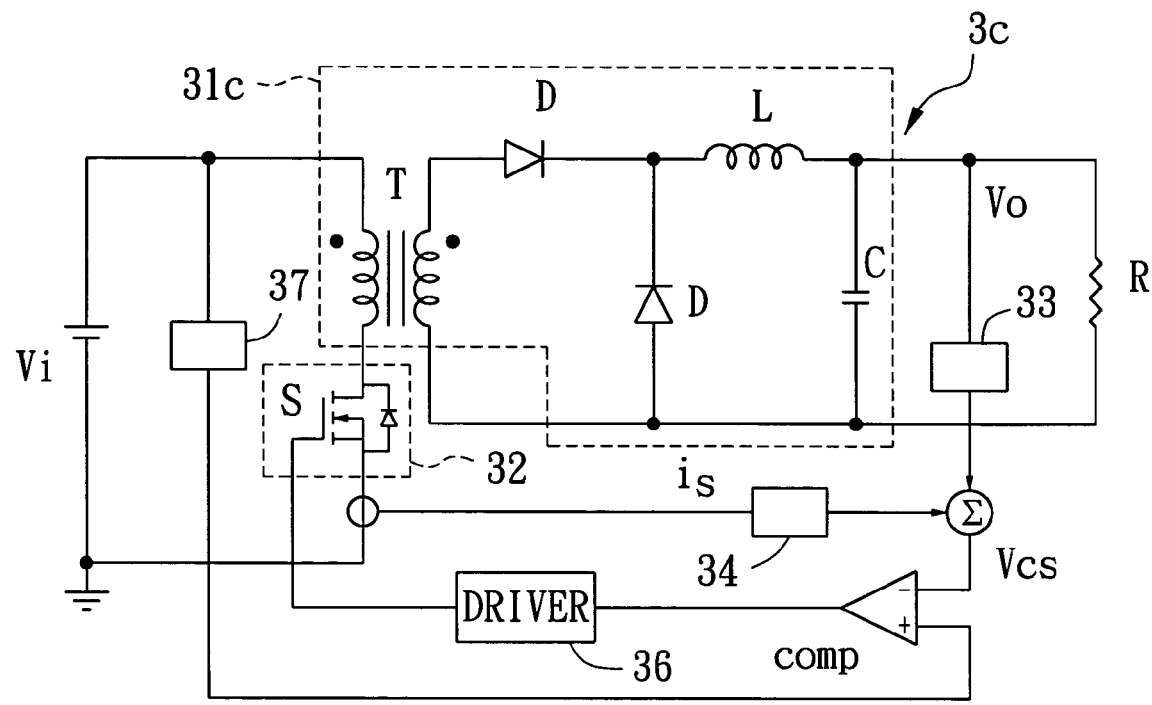
FIG. 8 is a schematic equivalent circuit diagram of the fourth preferred embodiment of a power control circuit according to the present invention, illustrating how rated power supplied thereby to a load is controlled.

FIG. 8 illustrates the fourth preferred embodiment of a power control circuit (3c) according to this invention, which is a modification of the second preferred embodiment. The power control circuit (3c) of FIG. 8 differs from the power control circuit (3a) of FIG. 4 in that the DC-to-DC converter is a forward DC-to-DC converter, wherein the LC circuit (31c) includes a transformer (T), two diodes (D), an inductor (L) and a capacitor (C).

Figure 9:
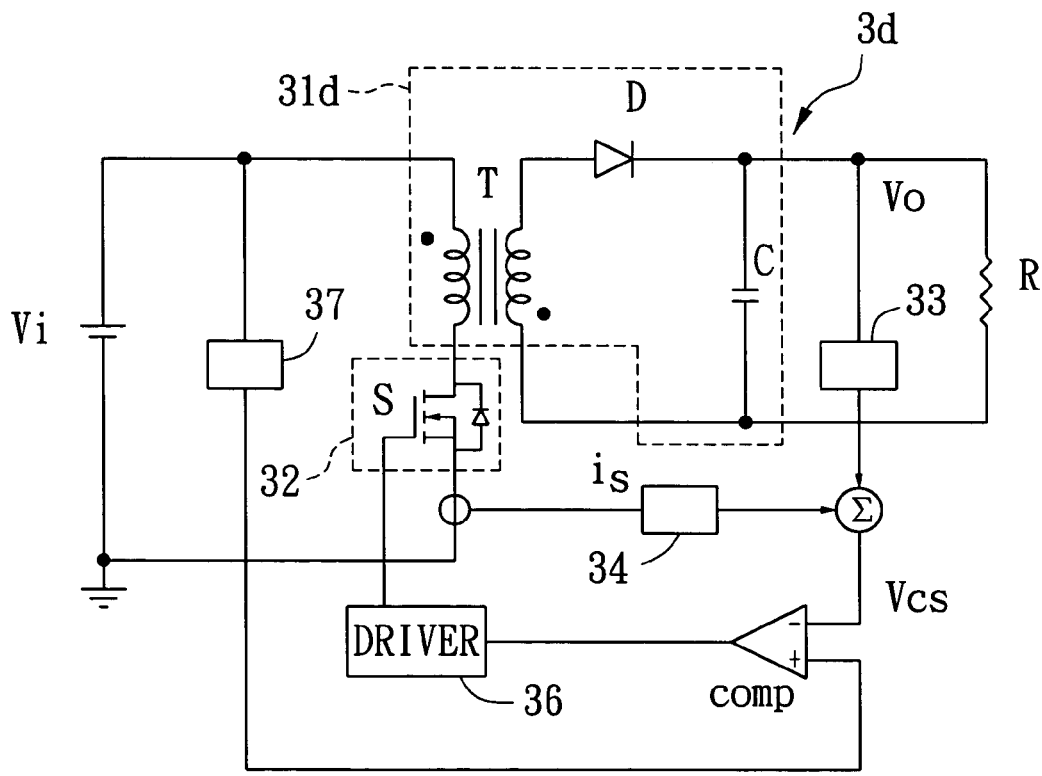
FIG. 9 is a schematic equivalent circuit diagram of the fifth preferred embodiment of a power control circuit according to the present invention, illustrating how rated power supplied thereby to a load is controlled.

FIG. 9 illustrates the fifth preferred embodiment of a power control circuit (3d) according to this invention, which is a modification of the second preferred embodiment. The power control circuit (3d) of FIG. 9 differs from the power control circuit (3a) of FIG. 4 in that the DC-to-DC converter is a flyback DC-to-DC converter, wherein the LC circuit (31d) includes a transformer (T), a diode (D) and a capacitor (C).

Figure 10:
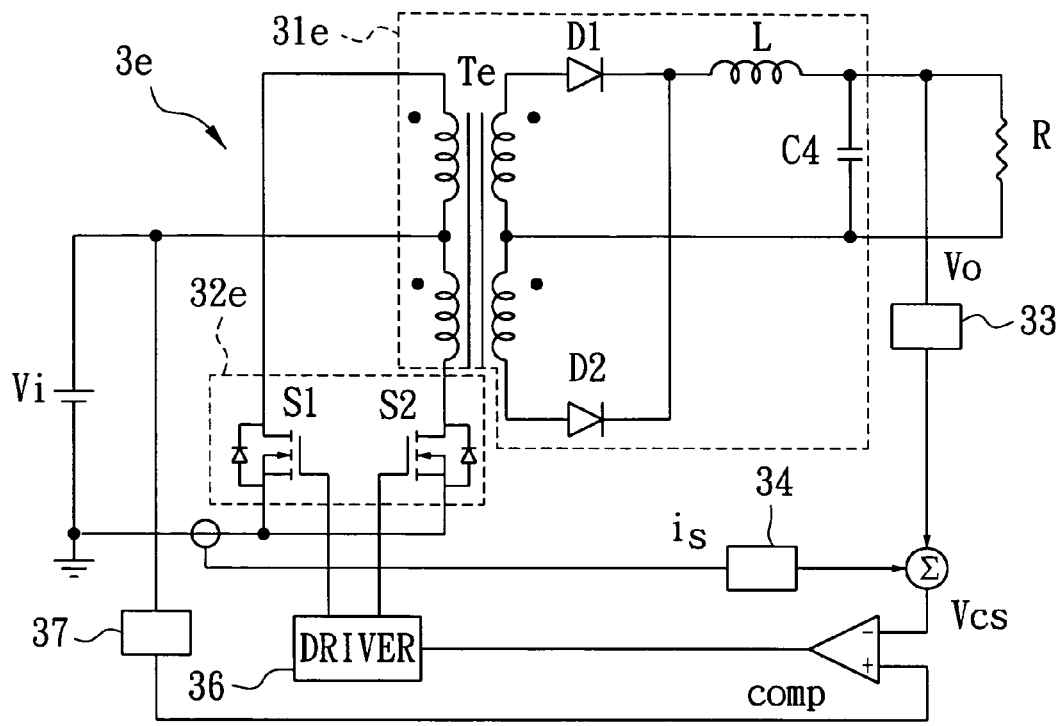
FIG. 10 is a schematic equivalent circuit diagram of the sixth preferred embodiment of a power control circuit according to the present invention, illustrating how rated power supplied thereby to a load is controlled.

FIG. 10 illustrates the sixth preferred embodiment of a power control circuit (3e) according to this invention, which is a modification of the second preferred embodiment. The power control circuit (3e) of FIG. 10 differs from the power control circuit (3a) of FIG. 4 in that: the DC-to-DC converter is a push-pull DC-to-DC converter, wherein the LC circuit (31e) includes a transformer (Te), two diodes (D1, D2), an inductor (L) and a capacitor (C4); and the power switch unit (32e) includes two switches (S1, S2) controlled by the driver (36).

Figure 11:
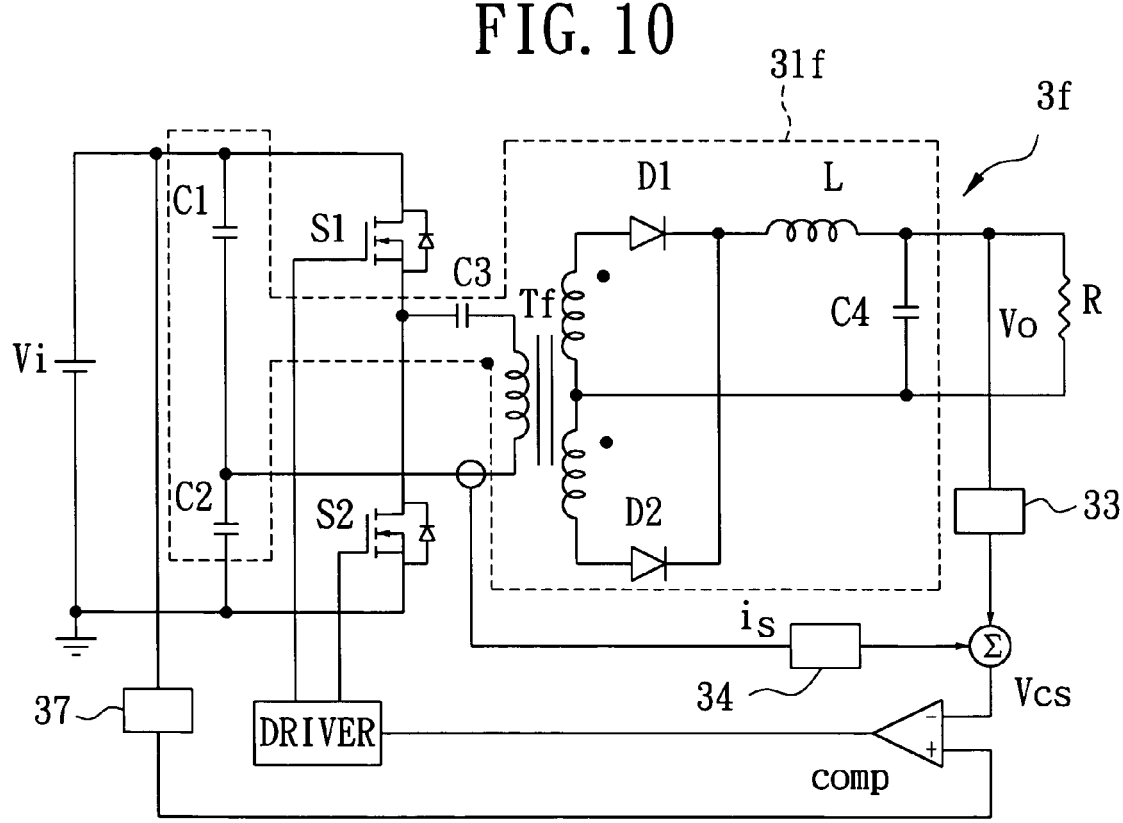
FIG. 11 is a schematic equivalent circuit diagram of the seventh preferred embodiment of a power control circuit according to the present invention, illustrating how rated power supplied thereby to a load is controlled.

FIG. 11 illustrates the seventh preferred embodiment of a power control circuit (3f) according to this invention, which is a modification of the sixth preferred embodiment. The power control circuit (3f) of FIG. 11 differs from the power control circuit (3e) of FIG. 10 in that the DC-to-DC converter is a half-bridge DC-to-DC converter, wherein the LC circuit (31f) includes a transformer (Tf), two diodes (D1, D2), an inductor (L) and four capacitors (C1, C2, C3, C4).

Figure 12:
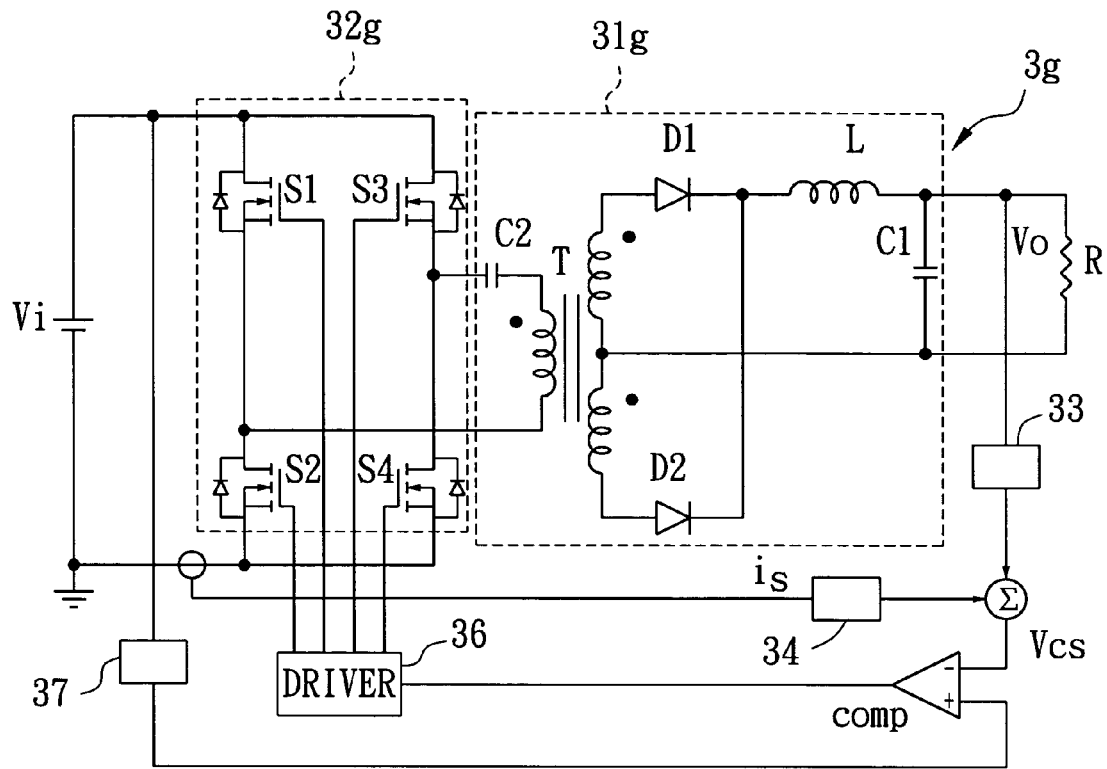
FIG. 12 is a schematic equivalent circuit diagram of the eighth preferred embodiment of a power control circuit according to the present invention, illustrating how rated power supplied thereby to a load is controlled.

FIG. 12 illustrates the eighth preferred embodiment of a power control circuit (3g) according to this invention, which is a modification of the seventh preferred embodiment. The power control circuit (3g) of FIG. 12 differs from the power control circuit (3f) of FIG. 11 in that: the DC-to-DC converter is a full-bridge DC-to-DC converter, wherein the LC circuit (31f) has only two capacitors (C1, C2); and the power switch unit (32g) includes four switches (S1, S2, S3, S4) controlled by the driver 36.

Figure 13:
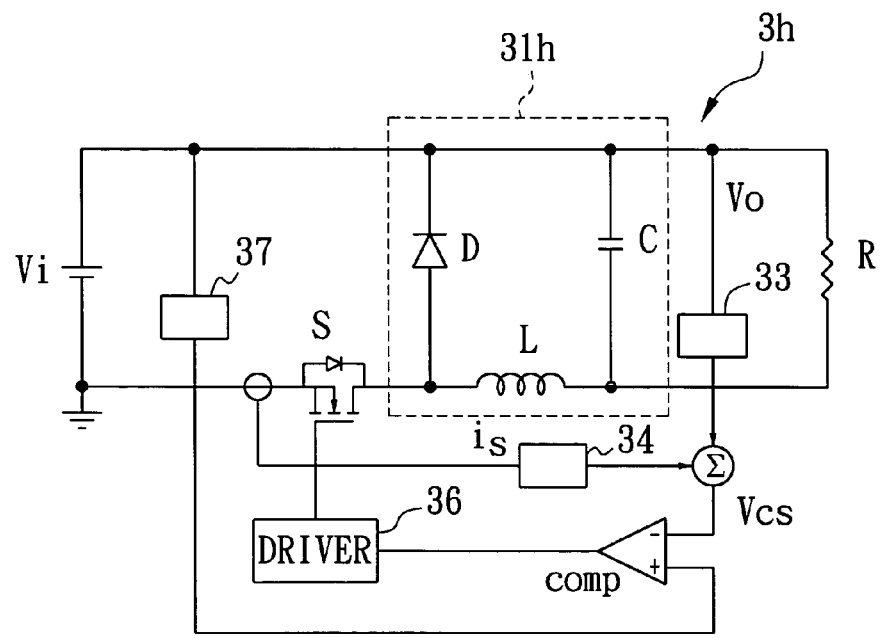
FIG. 13 is a schematic equivalent circuit diagram of the ninth preferred embodiment of a power control circuit according to the present invention, illustrating how rated power supplied thereby to a load is controlled.

FIG. 13 illustrates the ninth preferred embodiment of a power control circuit (3h) according to this invention, which is a modification of the second preferred embodiment. In this embodiment, the DC-to-DC converter (31h) is a low side drive buck DC-to-DC converter.

The power control circuit of this invention may also be implemented in the form of a buck-boost DC-to-DC converter in other embodiments (not shown).

In sum, since the voltage detecting unit 33 and the current detecting unit 34 may be implemented using only resistors, and since multipliers are not required, the power control circuit (3, 3a~3h) of the present invention can be fabricated at relatively low costs.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A power control circuit comprising:
an LC circuit adapted to be connected to a load and adapted to output an output voltage to the load;
a power switch unit connected to said LC circuit, adapted to be connected to an external power source for receiving an input voltage therefrom, and operable so as to enable and disable supply of the input voltage from the external power source to said LC circuit, said power switch unit having a control input unit;

a voltage detecting unit for detecting the output voltage applied to the load and for generating a first voltage signal in accordance with the output voltage applied to the load;

a current detecting unit for detecting a current flowing through said power switch unit and for generating a second voltage signal in accordance with the current flowing through said power switch unit;

a comparator for comparing a summation of the first and second voltage signals with a reference voltage and for outputting a pulse width modulation signal in accordance with a comparison result between the summation of the first and second voltage signals and the reference voltage; and a driver connected electrically to said control input unit of said power switch unit and said comparator, said driver receiving the pulse width modulation signal from said comparator and outputting a driving signal to said control input unit of said power switch unit so as to control a duty cycle of said power switch unit, thereby controlling rated power supplied to the load to correspond to the reference voltage.

2. The power control circuit as claimed in claim 1, wherein said voltage detecting unit includes a series of first and second resistors adapted to be connected across the load, the first voltage signal being a voltage drop at said second resistor.

3. The power control circuit as claimed in claim 1, wherein said current detecting unit includes a level resistor connected in series to a current path of said power switch unit and said LC circuit and connected electrically to said voltage detecting unit, said second voltage signal being a voltage drop at said level resistor.

4. The power control circuit as claimed in claim 1, wherein:
said voltage detecting unit includes a series of first second resistors adapted to be connected across the load, the first voltage signal being a voltage drop at said second resistor;
said current detecting unit includes a level resistor connected in series to a current path of said power switch unit and said LC circuit, said level resistor having a first end connected electrically to said second resistor of said voltage detecting unit and said LC circuit, and a grounded second end, the second voltage signal being a voltage drop at said level resistor; and
said comparator has a first input end connected to a junction node of said first and second resistors of said voltage detecting unit so as to receive the summation of the first and second voltage signals, and a second input end for receiving the reference voltage.

5. The power control circuit as claimed in claim 1, further comprising an input voltage detecting unit adapted for detecting the input voltage from the external power source and for providing to said comparator the reference voltage that is generated in accordance with the input voltage.

6. The power control circuit as claimed in claim 5, wherein said input voltage detecting unit includes a series of third and fourth resistors adapted to be connected across the external power source, the reference voltage being a voltage drop at said fourth resistor of said input voltage detecting unit.

7. The power control circuit as claimed in claim 1, wherein said power switch unit includes one of a BJT, a MOSFET and an IGBT.

8. A method of controlling rated power supplied by a power control circuit to a load, the power control circuit including
an LC circuit connected to a load and outputting an output voltage to the load, and
a power switch unit connected to the LC circuit, connected to an external power source for receiving an input voltage therefrom, and operable so as to enable and disable supply of the input voltage from the external power source to the LC circuit, the power switch unit having a control input unit,
said method comprising the steps of:
detecting the output voltage applied to the load and generating a first voltage signal in accordance with the output voltage applied to the load;
detecting a current flowing through the power switch unit and generating a second voltage signal in accordance with the current flowing through the power switch unit;
comparing a summation of the first and second voltage signals with a reference voltage and outputting a pulse width modulation signal in accordance with a comparison result between the summation of the first and second voltage signals and the reference voltage; and
outputting a driving signal to the control input unit of the power switch unit in accordance with the pulse width modulation signal so as to control a duty cycle of the power switch unit, thereby controlling the rated power to correspond to the reference voltage.

9. The method as claimed in claim 8, wherein the reference voltage is generated in accordance with the input voltage from the external power source.

* * * * *